(12) United States Patent
Hunt

(10) Patent No.: US 8,171,068 B2
(45) Date of Patent: May 1, 2012

(54) GENERATING UNIQUE PSEUDORANDOM NUMBERS

(75) Inventor: Brand L. Hunt, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 1278 days.

(21) Appl. No.: 11/848,644

(22) Filed: Aug. 31, 2007

(65) Prior Publication Data

US 2009/0063601 A1   Mar. 5, 2009

(51) Int. Cl.
*G06F 7/58* (2006.01)
(52) U.S. Cl. ............................................. 708/250
(58) Field of Classification Search ........... 708/250–256
See application file for complete search history.

(56) References Cited

U.S. PATENT DOCUMENTS

2008/0279373 A1\* 11/2008 Erhart et al. .................... 380/46

\* cited by examiner

*Primary Examiner* — Tan V Mai
(74) *Attorney, Agent, or Firm* — Yudell Isidore Ng Russell PLLC

(57) ABSTRACT

A method of generating a set of unique pseudorandom N-digit base-B integers includes the steps of selecting an integer A, wherein A is equal to or greater than 0 and equal to or less than $B^N-1$, and adding to integer A an integer P, modulus $B^N$, wherein P is equal to or greater than 0 and equal to or less than $B^N-1$, and wherein P and N are relatively prime, to obtain a first element of the set. The method generates a second element of the set by adding P to the first element, modulus $B^N$. The method generates the complete set of unique pseudorandom N-digit base-B integers by repeating the process $B^N$ times. Elements of the set may be used to populate a data set.

12 Claims, 3 Drawing Sheets

GENERATING UNIQUE PSEUDORANDOM NUMBERS

BACKGROUND OF THE INVENTION

1. Technical Field

The present invention relates generally to the field of pseudorandom number generation, and more particularly to a method of populating a data set with unique pseudorandom numbers.

2. Description of the Related Art

It is necessary in many applications to populate data sets with unique pseudorandom numbers. For example, in testing applications, one may populate a data set with unique pseudorandom numbers, such as 9-digit Social Numbers, in order to give the application numbers to work on. In another example, one may wish to assign identification numbers to identify individuals. Since, the same number cannot be used to identify more than one individual, the numbers must be unique. Also, the numbers should be pseudorandom and relatively sparse, so that a hacker will be unlikely to guess valid identification numbers.

Currently, unique pseudorandom numbers are generated by first generating a pseudorandom number and then determining if the generated number is unique. The determination of uniqueness is done by storing each number that is used and comparing a generated number to the stored used numbers. If the number has already been used, the generated number is discarded and a new number is generated. When large numbers of numbers are generated, the storage and comparison tasks become cumbersome.

SUMMARY OF THE INVENTION

The present invention provides method of generating a set of unique pseudorandom N-digit base-B integers. Briefly, stated an embodiment of the present invention includes the steps of selecting an integer A, wherein A is equal to or greater than 0 and equal to or less than $B^N-1$, and adding to integer A an integer P, modulus $B^N$, wherein P is equal to or greater than 0 and equal to or less than $B^N-1$, and wherein P and N are relatively prime, to obtain a first element of the set. The method generates a second element of the set by adding P to the first element, modulus $B^N$. The method generates the complete set of unique pseudorandom N-digit base-B integers by repeating the process $B^N$ times. Elements of the set may be used to populate a data set.

An alternative embodiment of the method according to the present invention includes the step of generating an element of a first subset of Y-digit base-B integers, wherein Y is less than N, by adding to an integer $A_Y$ an integer $P_Y$, modulus $B^Y$, wherein $A_Y$ is equal to or greater than 0 and equal to or less than $B^Y-1$, and wherein $P_Y$ is equal to or greater than 0 and equal to or less than $B^Y-1$, and wherein $P_Y$ and $B^Y$ are relatively prime. The method generates an element of a second subset of Z-digit base-B integers, wherein Z is equal to N minus Y, by adding to an integer $A_Z$ an integer $P_Z$, modulus $B^Z$, wherein $A_Z$ is equal to or greater than 0 and equal to or less than $B^Z-1$, and wherein $P_Z$ is equal to or greater than 0 and equal to or less than $B^Z-1$, and wherein $P_Z$ and $B^Z$ are relatively prime. The method then concatenates the generated element of the first subset with the generated element of the second subset to obtain an element of the set.

A further alternative embodiment of the method according to the present invention includes the step of generating an element of each of X subsets $S_i$ of (N/X)-digit base-B integers, wherein X is a factor of N, by adding to an integer $A_i$ an integer $P_i$, modulus $B^{N/X}$, wherein $A_i$ is equal to or greater than 0 and equal to or less than $B^{N/X}-1$, and wherein $P_i$ is equal to or greater than 0 and equal to or less than $B^{N/X}-1$, and wherein $P_i$ and $B^{N/X}$ are relatively prime. The method then concatenates the elements thus generated to obtain an element of the set.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
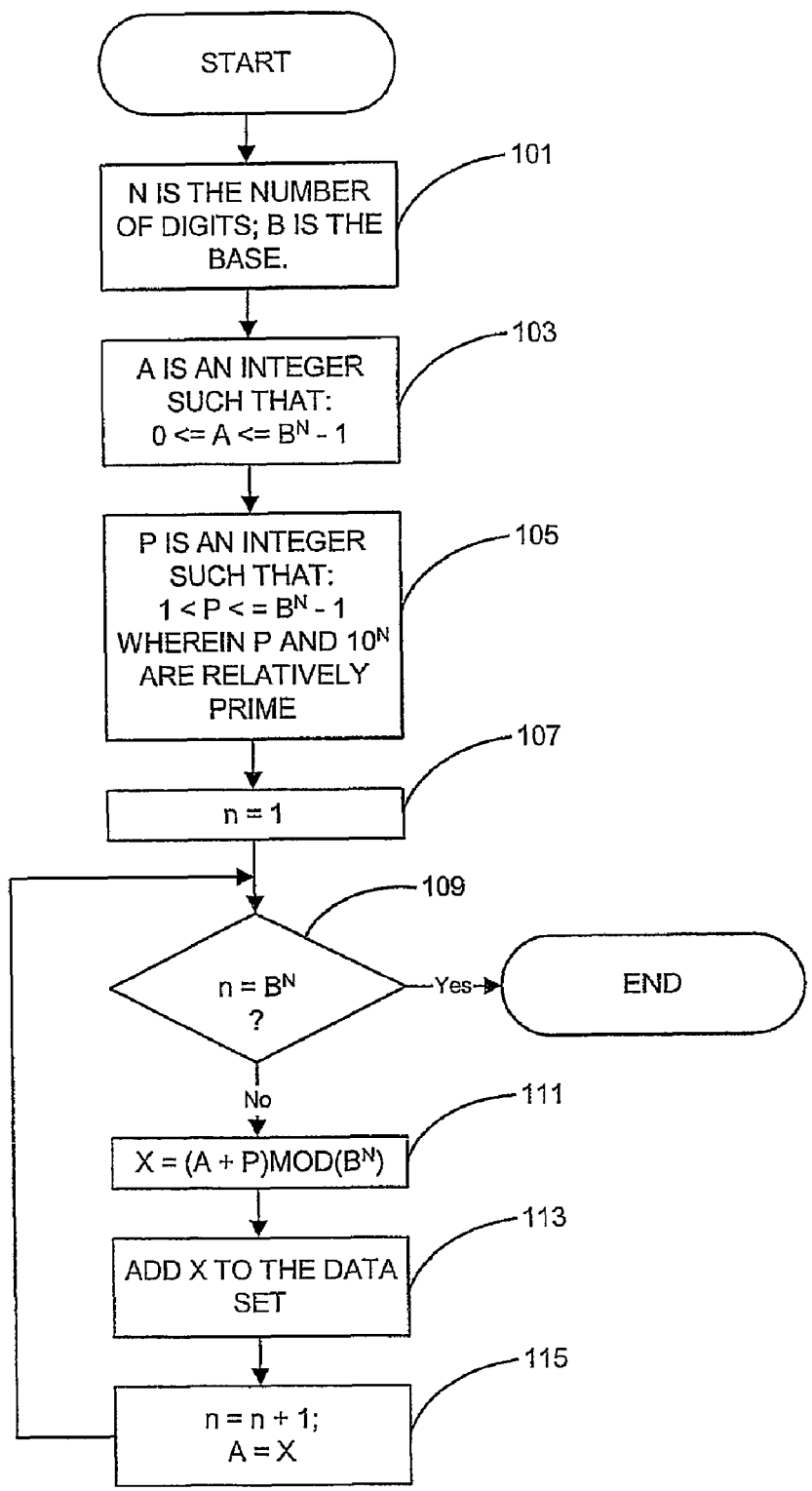
FIG. 1 is a flow chart of an embodiment of a method according to the present invention.

FIG. 1 is a flow chart of an embodiment of the present invention. If as indicated at block 101, the number of digits in the set of unique pseudorandom numbers to be produced is N, at the base of the number is B. For example, the embodiment of FIG. 1 may be used to generate a set of unique pseudorandom four-digit base-ten numbers. As indicated at block 103, a seed integer A is selected, such that:

$$0 \leq A \leq B^N-1$$

In the four-digit base-ten example, seed integer A is an integer between 0000 and 9999. Then, as indicated at block 105, an integer P is selected such that:

$$1 < P \leq B^N-1, \text{ and}$$

P and $B^N$ are relatively prime.

As is known to those skilled in the art, two numbers are relatively prime when they have no common factor other than 1. In the five digit base-10 example, P is selected such that it and 10,000 are relatively prime. P is preferably a prime number; however, the number 5 is a prime number but it is not relatively prime with a power of 10. Accordingly, the prime number 5 is not a suitable candidate for P in a base-10 example. Additionally, P may be selected from non-prime numbers. For example, 6561 is not a prime number but it is relatively prime with 10,000.

Preferably, P is selected to be a number at about one-third or about two-thirds of the range of unique pseudorandom numbers to be generated. In the four-digit base-ten example, good selections for P may include prime numbers around 3331 and prime numbers around 6661. For purposes of illustration, P can be 6661 and seed integer A can be an arbitrary four-digit number, such as 1562.

After selecting a seed integer A and a relatively prime number P, the method and counter index n equal to 1, at block 107. Then, the method determines, at decision block 109, if n is equal to $B^N$. In the four digit base-10 example, the method determines if n is equal to 10,000. Then, as indicated at block 111, the method performs the following calculation:

$$X=(A+P) MOD B^N$$

Thus, in the example, the method adds 1562 to 6661, modulo 10, to obtain 8223. Then, the method adds the result X to the data set, as indicated at block 113. Then, the method sets n=N+1 and A=X, at block 115, and processing returns to decision block 109. Processing continues until the method has generated 10,000 unique four-digit numbers. In the example, the first five numbers are 8223, 4884, 1545, 8206, and 4867.

Figure 2:
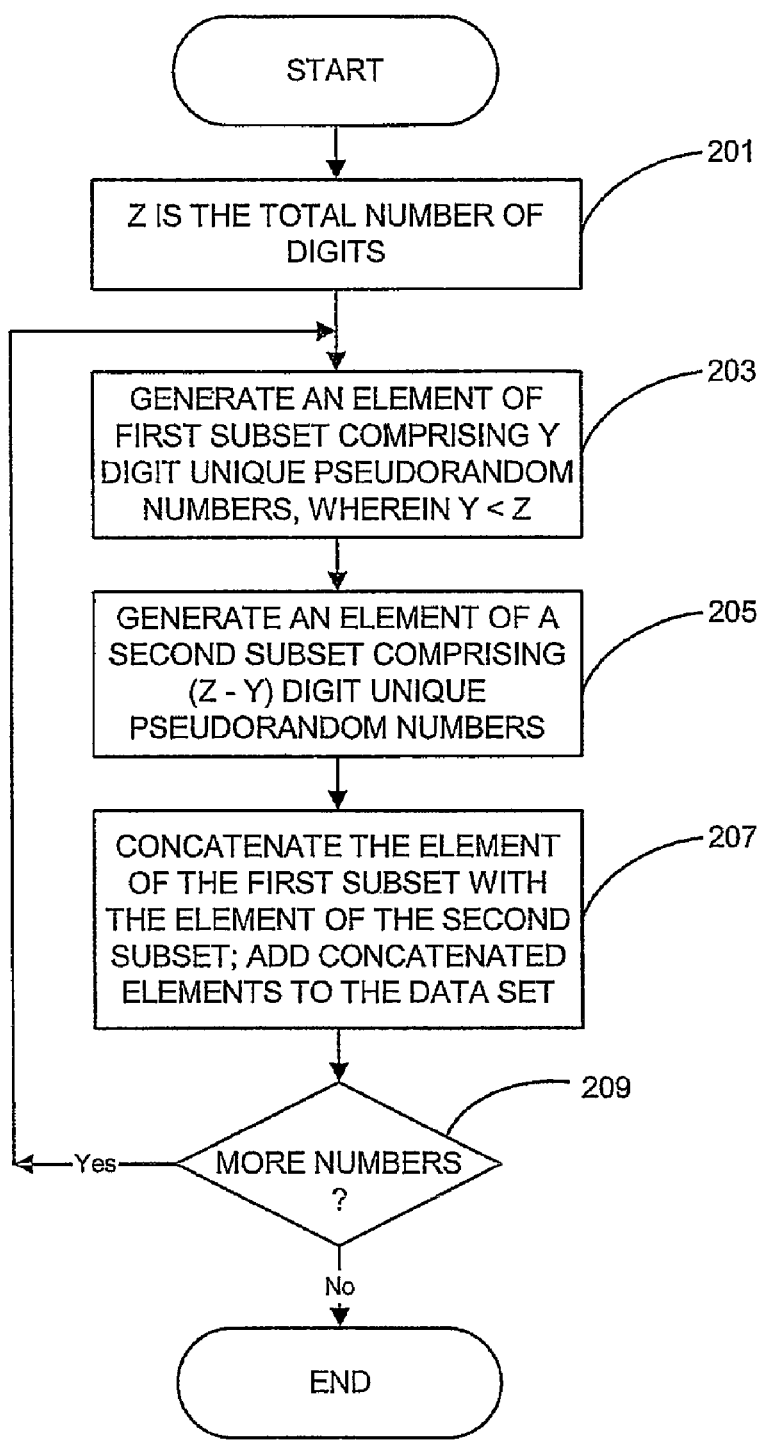
FIG. 2 is a flow chart of an alternative embodiment of a method according to the present invention; and, FIG. 3 is a flow chart of a second alternative embodiment of a method according to the present invention.

FIG. 2 is a flow chart of an alternative embodiment of the present invention that generates unique pseudorandom Z-digit base-N integers by generating Y-digit base-N integers and concatenating those integers with (Z−Y)-digit base-N integers. Accordingly, as indicated at block 201, Z is the total number of digits. As indicated at block 203, the method generates an element of the first subset comprising Y digit numbers, wherein Y is less than Z. For example, Z may be seven and Y may be four. The element of the first subset may be generated according to the process illustrated in FIG. 1. Thus, to generate a 4-digit base-10 number, seed integer A is selected, such that A is equal to or greater than zero and less than or equal to 9999. A number of P is selected, such that P is greater than one and less than or equal to 9999, and such that P and 10,000 are relatively prime. For example, let seed integer A equal 0003 and let P equal 6701. The first number generated is 0003 plus 6701, modulo 10,000. The first five numbers generated according to the present invention would be 6704, 3405, 0106, 6807, and 3508.

Returning to FIG. 2, the method then generates an element of a second subset of (Z−Y)-digit unique pseudorandom numbers, as indicated at block 205. In the example where Z is seven and Y is four, (Z−Y) is three. Thus, the method generates a 3-digit base-10 number according to the process of FIG. 1, a seed integer A is selected between 000 and 999, and an integer P is selected between 1 and 999, wherein A and P are relatively prime. Let A equal 456 and let P equal 673. Then, the method adds 456 and 673, modulo 1000. The first five numbers generated according to the present invention would be 129, 802, 475, 148, and 821. Then, the method of FIG. 2 concatenates the number generated at block 203 with the number generated at block 205, and adds that number to the data set, as indicated at block 207. Thus, in the example, the first number generated is 6704129. The method of FIG. 2 determines, at decision block 209, if more numbers are needed. If so, processing returns to block 203. The first five numbers generated in the example are 6704129, 3401802, 0126475, 6807148, and 3508821.

It will be observed that in the above example, the process of FIG. 2 will generate only 10,000 unique 7-digit base-10 numbers, while there are 10,000,000 7-digit base-10 numbers. Each time the method cycles through the entire set of 10,000 4-digit numbers, the method will cycle through the set of 1000 3-digit numbers ten times, at which time the 7-digit numbers will begin to repeat. After each 10,000 iterations, the method can re-order the set of 3-digit numbers. For example, the first number of the set may be moved to the end of the set. The reordering process may be done 999 times at the end of each 10,000 iterations to produce the entire set of 10,000,000 digit numbers.

Figure 3:
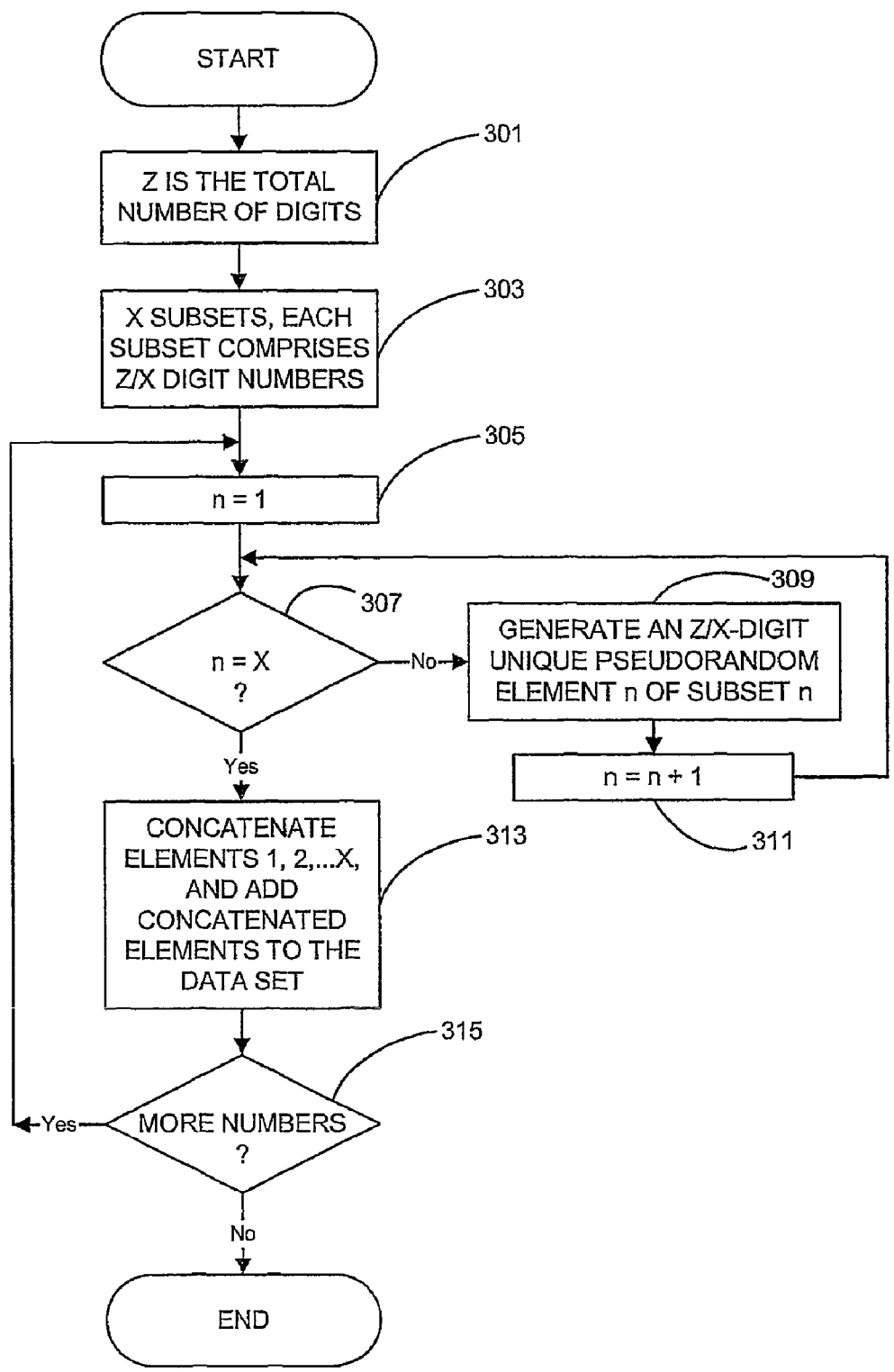

FIG. 3 is flow chart of a further alternative embodiment of the present invention. As indicated at block 301, Z is the number of digits. For example, Z may be equal to nine. The method defines X subsets, at block 303, wherein each subset comprises Z/X digit numbers. For example, where Z is equal to nine, X can be equal to three, so that each subset comprises 3-digit numbers. The method then sets a counter n equal to 1, at block 305. The method determines, at decision block 307, if n is equal to X. If not, the method generates an element n of subset n, at block 309. Element n may be generated according to the process of FIG. 1. In the example where Z is 9 and x is 3, the method generates a 3-digit base-10 number according to the process of FIG. 1. A seed integer A is selected between 000 and 999, and an integer P is selected between 1 and 999, wherein A and P are relatively prime. Let A equal 456 and let P equal 673. Then, the method adds 456 and 673, modulo 1000. The first five numbers generated according to the present invention would be 129, 802, 475, 148, and 821. Then, at block 311, the method sets count n to n+1 and processing returns to decision block 307. The process loops through blocks 307-311 until n equals X. Thus, in the example, the process generates elements of three subsets of 3-digit numbers according to the process of FIG. 1. The seed A for the second set can be an arbitrary 3-digit number, such as 200, and P can be an arbitrary relatively prime number, such as 719. The seed A for the third subset can be an arbitrary 3-digit number, such as 819, and P can be arbitrary relatively prime number, such as 733. In such case, the first number of the second subset would be 919, and the first number of the third subset would be 552. The method then, at block 313, concatenates elements 1, 2, . . . X and adds the concatenated elements to the data set, at block 313. Thus, in the example, the first concatenated 9-digit number is 129919552. The first five concatenated numbers are 129919552, 802638285, 475357018, 148076751, and 821795484. The method determines at decision block 315 if more numbers are needed. If so, processing returns to block 305.

It will be observed again that in the above example, the process of FIG. 3 will generate only 1,000 unique 9-digit base-10 numbers, while there are 1,000,000,000 9-digit base-10 numbers. Each time the method cycles through the entire set of 1,000 3-digit numbers, the 9-digit numbers will begin to repeat. Thus, after each 1,000 iterations of the first million iterations, the method can re-order the third subset of 3-digit numbers. Then, after each 1,000,000 iterations, the method can reorder the second subset of 3-digit numbers. For example, the first number of the second and third subsets may be moved to the end of the respective subset. The reordering process may be done until the entire set of 1,000,000,000 unique pseudorandom 9-digit base-10 numbers has been produced.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. For example, in the embodiments of FIGS. 2 and 3, the elements are generated and concatenated one at a time. Those skilled in the art will recognize that the elements of the subsets may be generated in a batch process and then concatenated. Accordingly, the foregoing description is intended for purposes of illustration and not of limitation.

What is claimed is:

1. A method of generating a set of unique pseudorandom N-digit base-B integers, the method comprising:
   (a) selecting an integer A, wherein A is equal to or greater than 0 and equal to or less than $B^N-1$;
   (b) a computer adding to said integer A an integer P, modulus $B^N$, wherein P is equal to or greater than 0 and equal to or less than $B^N-1$, and wherein P and $B^N$ are relatively prime, to obtain an element of said set;
   (c) adding to the result of step (b) said integer P, modulus $B^N$, to obtain an element of said set; and
   (d) repeating step (c) $B^N$ times, to obtain said set.

2. The method as claimed in claim 1, wherein B is 10.

3. The method as claimed in claim 1, wherein P is greater than one half $B^N$.

4. The method as claimed in claim 3, wherein P is greater than two-thirds $B^N$.

5. The method as claimed in claim 4, wherein P is less than three-fourths $B^N$.

6. The method as claimed in claim 1, further comprising:
   populating a data set with said element.

7. A method of generating a set of unique pseudorandom N-digit base-B integers, the method comprising:
   a computer generating an element of a first subset of Y-digit base-B integers, wherein Y is less than N, by adding to an integer $A_Y$ an integer $P_Y$, modulus $B^Y$, wherein $A_Y$ is equal to or greater than 0 and equal to or less than $B^Y-1$, and wherein $P_Y$ is equal to or greater than 0 and equal to or less than $B^Y-1$, and wherein $P_Y$ and $B^Y$ are relatively prime;
   generating an element of a second subset of Z-digit base-B integers, wherein Z is equal to N minus Y, by adding to an integer $A_Z$ an integer $P_Z$, modulus $B^Z$, wherein $A_Z$ is equal to or greater than 0 and equal to or less than $B^Z-1$, and wherein $P_Z$ is equal to or greater than 0 and equal to or less than $B^Z-1$, and wherein $P_Z$ and $B^Z$ are relatively prime; and,
   concatenating said element of said first subset with said element of said second subset to obtain an element of said set.

8. The method as claimed in claim 7, wherein:
   generating said element of said first subset further comprises adding to the result of step (a) $P_Y$, modulus $B^Y$; and
   generating said element of said second subset further comprises adding to the result of step (b) $P_Z$, modulus $B^Z$.

9. The method as claimed in claim 7, wherein:
   Y is equal to one-half N, whereby Z is equal to Y.

10. The method as claimed in claim 7, further comprising:
    populating a data set with said element of said set.

11. A method of generating a set of unique pseudorandom N-digit base-B integers, the method comprising:
    (a) a computer generating an element of each of X subsets $S_i$ of (N/X)-digit base-B integers, wherein X is a factor of N, by adding to an integer $A_i$ an integer $P_i$, modulus $B^{N/X}$, wherein $A_i$ is equal to or greater than 0 and equal to or less than $B^{N/X}-1$, and wherein $P_i$ is equal to or greater than 0 and equal to or less than $B^{N/X}-1$, and wherein $P_i$ and $B^{N/X}$ are relatively prime; and
    (b) concatenating said elements generated in step (a) to obtain an element of said set.

12. The method as claimed in claim 11, wherein generating said element of each said subset further comprises:
    adding to the result of step (a), for each of said subset $S_i$, $P_i$, modulus $B^{N/X}$.

* * * * *